(No Model.)
W. C. BARR.
VEHICLE WHEEL.
No. 292,617. Patented Jan. 29, 1884.
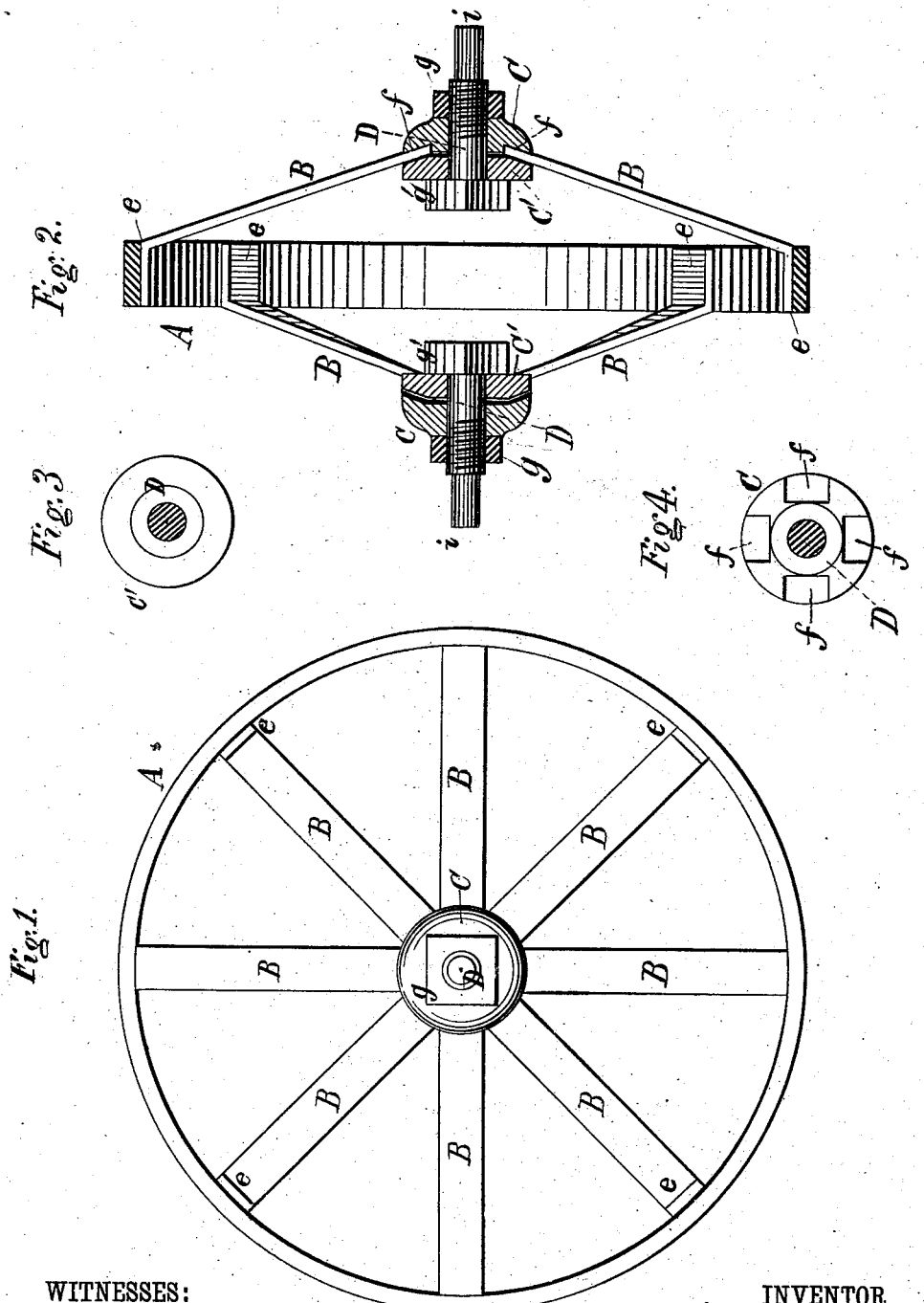
WITNESSES:
Jas. S. Ewbank
M. H. Benson
INVENTOR
William C. Barr
BY Francis C. Bowen
ATTORNEY.

UNITED STATES PATENT OFFICE.

WILLIAM C. BARR, OF JERSEY CITY, NEW JERSEY.

VEHICLE-WHEEL.

SPECIFICATION forming part of Letters Patent No. 292,617, dated January 29, 1884.

Application filed October 13, 1883. (No model.)

*To all whom it may concern:*

Be it known that I, WILLIAM C. BARR, a citizen of the United States, residing at Jersey City, in the county of Hudson and State of New Jersey, have invented certain new and useful Improvements in Vehicle-Wheels, of which the following is a specification, reference being had therein to the accompanying drawings.

My invention relates to wheels for wheelbarrows and other vehicles, and especially that class of wheels for which Letters Patent of the United States, No. 151,073, were granted to me May 19, 1874.

The object of my present invention is to avoid the welding of the arms composing the spokes, as described in said Letters Patent, and thereby produce a cheaper wheel; to which end it consists in clamping the inner ends of the arms between two washers by means of screw-bolts, the outer ends of which form journals, one of the washers having recesses to receive said ends of the arms, and the opposed surfaces of the washers being beveled in planes corresponding to the position of the arms, as hereinafter more fully described.

In the accompanying drawings, in which like letters indicate like parts, Figure 1 is a side view of my wheel. Fig. 2 is a cross-section thereof. Figs. 3 and 4 are detail views of the washers.

The letter A designates the rim or felly of the wheel; B, the arms composing the spokes; C C', the washers, and D the screw-bolts. The arms B are arranged in two sets, as heretofore, and are secured to the rim A at the outer end by lugs or offsets *e*, or other suitable means, to thence project inward toward the axis of the wheel in outwardly-inclined planes. The inner ends of the arms B are fitted into recesses *f*, formed in the washer C of each set on its inner surface, there being two washers to each set of arms, and at the points where the arms enter between the two washers the latter are beveled on their opposed surfaces in planes corresponding to the position of the arms, as shown in Fig. 2, the recesses being, in fact, in the beveled portion of the proper washer. The bolts D pass through the washers C C', there being one to each set of washers, and on the threaded portion of the bolts, respectively, is fitted a nut, *g*, which, together with the head *g'* of the bolt, acts on the washers to clamp the arms between them. The free ends of the bolts D project outward on the wheel, and are left plain to form journals *i*, they being also preferably reduced in diameter.

The effect of the recesses *f* is to hold the arms B against lateral strain, and it is evident that the same may be transposed; while by beveling the washers C C', as described, to correspond with the position of the arms, they form a snug joint therewith. It should be understood that both washers C C' may be recessed.

What I claim as new, and desire to secure by Letters Patent, is—

The combination, substantially as hereinbefore set forth, with the rim A and arms B, of the washers C C', one recessed to receive the inner ends of the arms, and both beveled on their opposed surfaces in planes corresponding to the position of the arms, and the screw-bolts D, arranged to act on the washers for clamping the arms, the outer ends of the bolts forming journals.

In testimony whereof I affix my signature in presence of two witnesses.

WILLIAM C. BARR.

Witnesses:
FRANCIS CLARE BOWEN,
JAS. S. EWBANK.